US005528391A

United States Patent [19]

Elrod

[11] Patent Number: 5,528,391
[45] Date of Patent: Jun. 18, 1996

[54] INFRARED BEAM STEERING SYSTEM USING DIFFUSED INFRARED LIGHT AND LIQUID CRYSTAL APERTURES

[75] Inventor: Scott A. Elrod, Redwood City, Calif.

[73] Assignee: Xerox Corporation, Stamford, Conn.

[21] Appl. No.: 71,788

[22] Filed: Jun. 4, 1993

[51] Int. Cl.[6] .............................. G02F 1/13; H04B 10/24
[52] U.S. Cl. .............................. 359/36; 359/54; 359/159; 250/351
[58] Field of Search .................................. 359/36, 39, 54, 359/53, 48, 155, 157, 159, 172; 250/351

[56] References Cited

U.S. PATENT DOCUMENTS

| 4,143,263 | 3/1979 | Eichweber | 250/199 |
|---|---|---|---|
| 4,434,510 | 2/1984 | Lemelson | 455/603 |
| 4,504,119 | 3/1985 | Sekimoto et al. | 359/87 |
| 4,589,030 | 5/1986 | Kley | 359/41 |
| 4,717,913 | 1/1988 | Elger | 359/172 |
| 4,771,338 | 9/1988 | Fujiwara | 359/40 |
| 4,959,874 | 9/1990 | Saruta et al. | 455/601 |
| 5,036,199 | 7/1991 | Sakata et al. | 250/351 |
| 5,355,222 | 10/1994 | Heller et al. | 250/561 |

OTHER PUBLICATIONS

T. L. Miller, *Liquid Crystal Devices Free Space Optical Communications*, SPIE, vol. 1059, Space Sensing, Communications, and Networking (1989), pp. 154–161.

K. M. Flood et al., *Continuous Wide Angle Beam Steering Using Translation of Binary Microlens Arrays and A Liquid Crystal Phased Array*, SPIE, vol. 1211, Computer and Optically Formed Holographic Optics (1990), pp. 296–304.

Primary Examiner—William L. Sikes
Assistant Examiner—Tai V. Duong
Attorney, Agent, or Firm—Rosen, Dainow & Jacobs

[57] ABSTRACT

A system for scanning a room to find the location of target devices, and then locking onto them with stationary directed beams for two-way communication. In one embodiment, a base system in each room comprises an IR source/receiver combination plus an LCD display panel which covers the source/receiver and is addressed in such a way as to open up dynamic apertures through which IR radiation in a scanning mode can be directed toward any particular location in the room. When a device at that location senses that it is being irradiated by the base station, the targeted device responds by emitting a coded packet of IR pulses. This system takes advantage of the higher bandwidth communication that can be obtained with point-to-point communications, while still allowing for multiple devices at arbitrary locations in the same room.

9 Claims, 6 Drawing Sheets

INVALID CHECKSUM OR LOW AMPLITUDE ROUTINE

INFRARED BEAM STEERING SYSTEM USING DIFFUSED INFRARED LIGHT AND LIQUID CRYSTAL APERTURES

RELATED CASE

A commonly-owned, co-pending U.S. application, Ser. No. 08/081,729, filed Jun. 23, 1993 (D/93002), entitled "REMOTE OBJECT IDENTIFICATION SYSTEM".

This invention relates to an optical beam steering system, and in particular to a system for controlling the direction in which emitting devices emit or receiving devices receive optical radiation.

BACKGROUND OF INVENTION

There are many applications involving the emission or reception of optical radiation where being able to limit the solid angle of the path over which an optical beam travels can have significant benefits.

From another aspect, reducing multipath reflections from optical beams significantly increases the usable bandwidth of optical communication links.

One example, which is not meant to be limiting, is directed to a system for a room or other enclosure containing, at arbitrary locations, a large number of devices and one central diffuse infrared (IR) radiation source, the object of which is to locate one or more particular devices and lock onto them with stationary directed beams.

In a large room, radiation from a diffuse IR source travels in all directions. Light beams scattered from various surfaces in the room arrive with varying time delays at a given receiver, causing significant limitations on the bandwidth of transmitted data. This multipath problem limits the communication bandwidth to on the order of $(3.0 \times 10^8 \text{ m/sec})/d$, where d is a characteristic length for the room. In practice, this can limit the usable bandwidth to under 10 Mbit/sec.

SUMMARY OF INVENTION

An object of the invention is a system for controlling the direction and/or confining the path of an optical beam.

Another object of the invention is a system with a diffuse optical source in which multipath reflections are reduced.

Still another object of the invention is a low-cost system for locating arbitrarily positioned objects and for establishing high bandwidth point-to-point communication links with a selected object.

In accordance with one aspect of the invention, means are provided to open up a dynamic aperture in an optical shield or normally optically-opaque member located adjacent an optical emitter or optical receiver. By "dynamic aperture" is meant a region of a normally-opaque member that can be made at least partly transmissive to optical radiation under control of electronic signals, and in which the position of the aperture can be selectively moved to be oriented in the line of sight of an optical emitter to an optical receiver. The aperture size confines the solid angle in which the beam is emitted or received. The selective positioning ensures that the maximum signal intensity is obtained when the receiver only sees the emitter or the emitter only sees a particular receiver. The combination of beam confinement and optical steering provides significantly increased bandwidth communication.

In a preferred embodiment, the device for establishing the dynamic aperture is a liquid crystal device (LCD) type of panel.

One important application of the invention is a system for scanning a room to find the location of target devices, and then locking onto them with stationary directed beams for two-way communication. A base system in each room comprises an IR source/receiver combination plus an LCD panel which covers the source/receiver and is addressed in such a way as to open up dynamic apertures through which IR radiation in a scanning mode can be directed toward any particular location in the room. When a device at that location senses that it is being irradiated by the base station, the targeted device responds by emitting a coded packet of IR pulses. This system takes advantage of the higher bandwidth communication that can be obtained with point-to-point communications, while still allowing for multiple devices at arbitrary locations in the same room.

The above and further objects, details and advantages of the present invention will become apparent from the following detailed description of preferred embodiments thereof, when read in conjunction with the accompanying drawings.

DETAILED DESCRIPTION OF PREFERRED EMBODIMENTS

The system of the invention provides a low-cost way to dynamically steer radiation from a diffuse IR source in order to establish temporary connections that are point-to-point in nature. The system has the added feature of being able to scan the beam, searching to find the locations of various IR devices.

Figure 1:
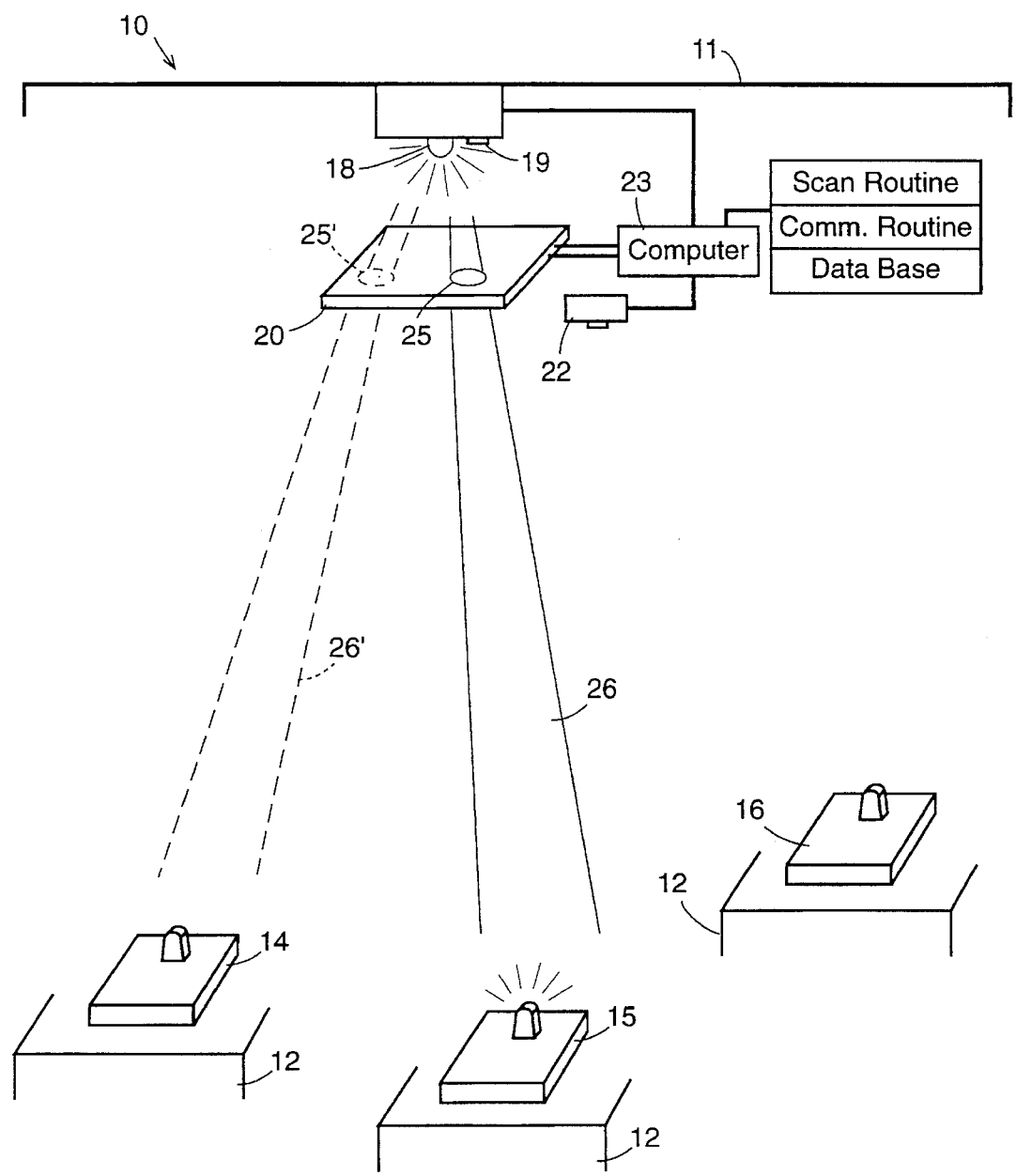
FIG. 1 is a schematic view of a room containing one form of a system in accordance with the invention.

FIG. 1 illustrates one simple application of the invention, used for scanning a room or other area to find the location of particular devices. The room is generally designated 10, comprising a ceiling 11 and a plurality of shelves 12 located in the room supporting one or more target devices 14, 15, 16, arbitrarily located. The system of the invention in this embodiment comprises an optical source of IR radiation 18 which also contains an adjacent optical receiver 19. Adjacent to the latter is an addressable LCD panel 20 located between the IR source 18 and receiver 19, and the devices 14–16. Also provided are an omnidirectional optical receiver 22 separated from the LCD panel 20, and a computer 23 connected to the two receivers 19, 22, the IR source 18, and the LCD panel 20.

The IR source 18, which can be conveniently mounted in the ceiling 11 so it can direct IR radiation in all directions, throughout the room 10, is a relatively high power wide-angle IR source that could consist, for example, of a high power LED or of an IR laser that is scattered from a roughened glass or plastic sphere. The computer 23, by providing electrical signals thereto, is used to control the LCD panel 20 in such a way as to create generally circular apertures 25, made up of pixels that are in the transmissive mode. By applying the appropriate electrical signals, the circular aperture 25 can be caused to scan across the LCD panel in a raster format, resulting in a scanning beam 26 of IR radiation in the room. While the beam 26 will still have a finite lateral extent, it will still be sufficiently localized to significantly reduce multipath bandwidth limitations of conventional diffuse IR systems. While a circular aperture is described, the invention is not limited to such aperture shapes and other aperture shapes can be used, such as an oval shape.

In the searching mode, the IR beam 26 is steered around the room 10 and is modulated with a signal that indicates it is searching for devices. When a target device 14–16 in the room receives and decodes this IR signal, meaning that it is aligned with the transmissive aperture 25 and the receiver 19 adjacent to the IR source 18, the device, in the example shown, designated 15, responds by emitting a coded packet of IR bits. The receiver 19, for example containing a photosensitive detector such as a phototransistor adjacent to the IR source 18, measures the amplitude of the return signal to find its peak value, and hence the exact direction of the responding device 15. The photosensitive device 19 is also used to receive in turn the IR bits from the other devices in the room. Alternatively, as will be described below, appropriate circuitry can be provided in the target device for finding the peak value of the signals indicating that the aperture is lined up with the target and source, before responding with its coded packet of IR bits. This has the advantage of avoiding contention between adjacent target devices.

In a room filled with target devices with IR receivers, it may be desirable to poll the devices serially in order to avoid overlapping packets. Once the system has located all receivers, it opens up one or more apertures 25 to communicate with appropriate devices as needed.

It will also be understood that the same IR sensor or detector 19 need not be used both for receiving the coded packet of IR bits and as part of the communication link. Different sensors could be used for each of those functions. As another alternative, the omnidirectional receiver 22 outside of the LCD panel 20 can be used to receive the coded packet of IR bits, and the receiver 19 behind the LCD panel 20 used in the communication link.

FIG. 1 shows aperture 25 aligned with source 18 and receiver 19 forming beam 26, and with device 15, and also shows in dashed lines another aperture 25' opened up at a different location in the panel 20 at the same or a different time, and aligned between source 18 and receiver 19 forming beam 26' and with device 14.

The system components described are all off-the-shelf components readily available from many suppliers. The addressable LCD display panel 20 can be a conventional active matrix panel with the usual electrical x-y addressing that allows under the control of appropriate signals from the computer 23 a selected cluster of LCD pixels in the shape of a circle to be switched from their normal non-transmissive or opaque state to their transmissive state when approximately 3–10% of incident radiation from the source 18 will pass through the aperture 25 in a narrow beam 26 confined by the opaque boundaries of the aperture 25. For a normal size storeroom, meeting room, or office space, sufficient IR power exists in the IR rays that can see a particular target device to enable the establishment of the high bandwidth communication link with the device.

The IR receivers both at the device or target end 14–16, and 19 at the source end could have, for example, a high gain phototransistor as the IR detector, and suitable amplifiers to produce a signal to activate an IR source on the device. An example of one simple way to implement the invention is to incorporate an inexpensive 4-bit microcontroller held in reset condition by a signal from a battery source, with the internal amplifiers operating a switch to release the reset condition to cause the microcontroller to execute a simple built-in program that sends a sequence of signals to an IR source on the device to flash it in a predetermined code of long and short flashes equivalent to a UPC bar code. Each device would be programmed with its own unique code pattern. The host computer 23 could easily store in its memory a database comprising the codes for each device and its current location, obtained by periodically activating the system. A simple comparison test of received codes to those stored in the database would allow periodic updating of the database. The above is straightforward programming well within the skills of the average programmer.

However, the invention is not limited to the foregoing example and also contemplates each target device being associated with more sophisticated computers with lots of computer power for establishing large bandwidth communication links with the sophisticated computer.

Figure 3:
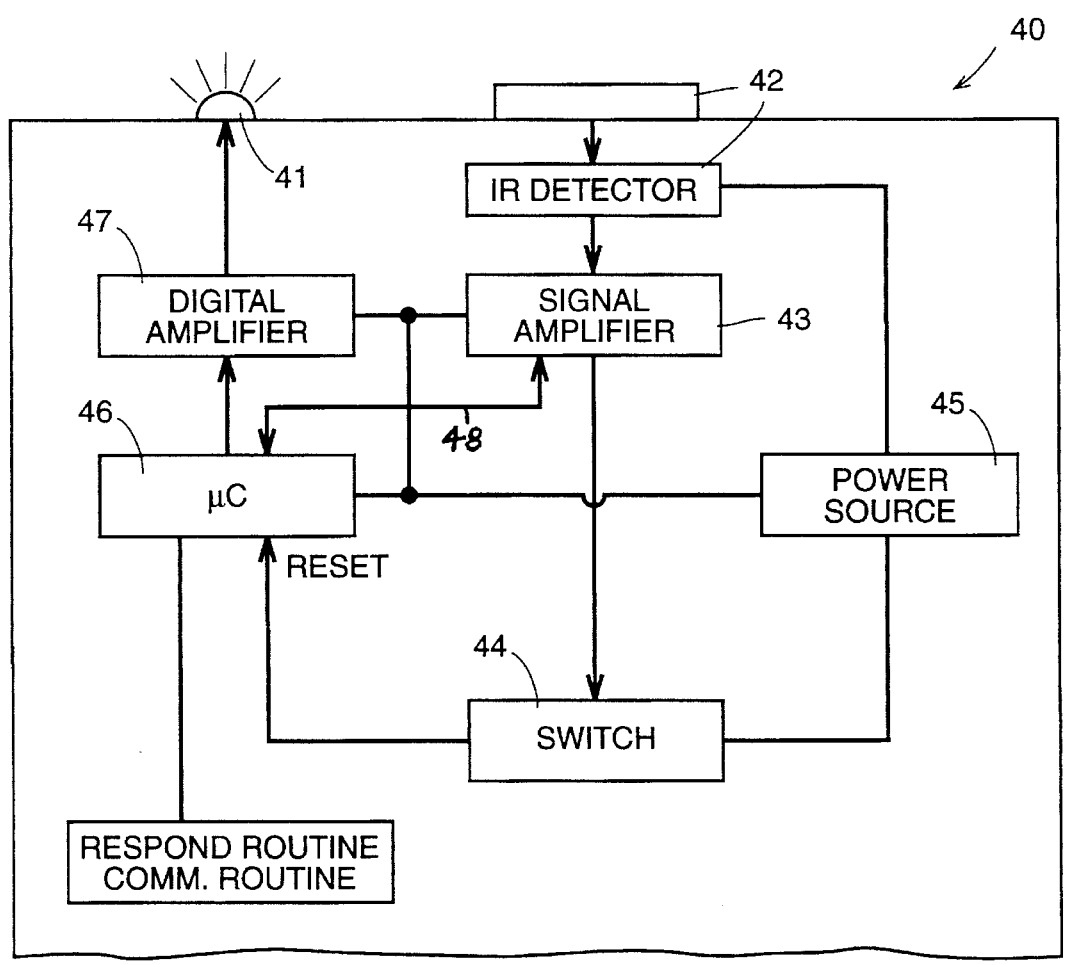
FIG. 3 is a block diagram of another form of target device for use in the system of FIG. 1.

FIG. 3 illustrates, in enlarged form, a block diagram of one form of a target device for use in the system of the invention. The device 40 comprises an IR source 41 and IR detector 42 whose output is amplified 43 to operate a switch 44 which via power from a supply 45 normally holds a microcontroller 46 in reset. When the switch is activated, reset is released and the programmed microcontroller 46 generates a sequence of digital signals which amplified 47 can flash the emitter 41 with a built-in code. The microcontroller 46 can then connect 48 with the amplifier to process any received communication signals and be provided with a standard set of responses to be delivered via the emitter 41.

When the scanning mode is finished, one or several apertures 25 can be opened up to allow, if desired, a communication link to be established between source/receiver 18/19 and one or several target devices at a time. For the purpose of communication, the IR source 18 under control of the computer 23 could send pulse-coded IR signals to the devices aligned with the aperture or apertures 25, and the receiver 19 in turn used to receive optical messages from the device. As described above, each device can be equipped with an IR emitter, an IR receiver, as well as an embedded microcontroller to control the latter to be used in the same way. Those skilled in the art will have no difficulty in selecting suitable IR sources and receivers, as well as in programming the computers to control the components to carry out such functions as:

1. turn-on IR source 18 and receiver 19 while causing the aperture 25 to scan across the display panel in raster format;
2. process the signals received by receiver 19 to decode the coded packet and identify each device and its location by the position of the aperture 25 when the signal intensity peaks;

3. open up a fixed aperture 25 to establish a communication link to a particular device;
4. pulse the IR source 18 to convey desired information to the selected device;
5. process any signals received from the selected device.

In the operation of the system so far described, by use of the dynamic transmissive aperture 25, only those rays from the diffuse source 18 that can see the selected device 15 actually are present in the room. The remaining rays are blocked by the normally opaque regions of the LCD panel which covers the source 18. This arrangement reduces multipath reflections and allows for the higher bandwidth communication available with point-to-point communications.

However, the invention is not limited to establishing a communication link. As described in the related case, the invention can be used to locate each device in the room for the purpose of, for example, maintaining an up-to-date database of devices and their locations for each room of, say, a laboratory where the devices are portable instruments and a particular scientist wishes to use a particular instrument but he or she must first locate the current room and current position in the room of the instrument. In this application, the target devices need not actively emit radiation, but can comprise the controllable reflectors described in the related case, whose contents are incorporated herein by reference. In the latter instance, when activated by incident radiation from the source when a target device is aligned by way of the aperture 25, the device exposes and covers in a coded pattern of intervals an IR reflector, and the coded IR reflections can be received by the receiver 19 and processed in the same way as described above.

In the invention so far described, the omnidirectional receiver 22 has not been used. The latter can be used in accordance with another aspect of the invention. By augmenting the system with an omnidirectional receiver 22 that is not situated behind the LCD panel 25, the receiver 22 would thus be capable of receiving signals from any direction and could be used for purposes, for example: when a device 14, 15, 16 in the room wants to transmit data, it could be programmed to send a short request packet to the omnidirectional receiver 22. This would signal the system to open up an aperture 25 pointing at that particular device.

Also, if the aperture 25 position is chosen on the basis of a location of the selected device in a database, and the selected device has since moved, the signal from the omnidirectional receiver 22 can be used to modify the aperture location or at least recognize a problem exists requiring rescanning of the room.

Figure 4:
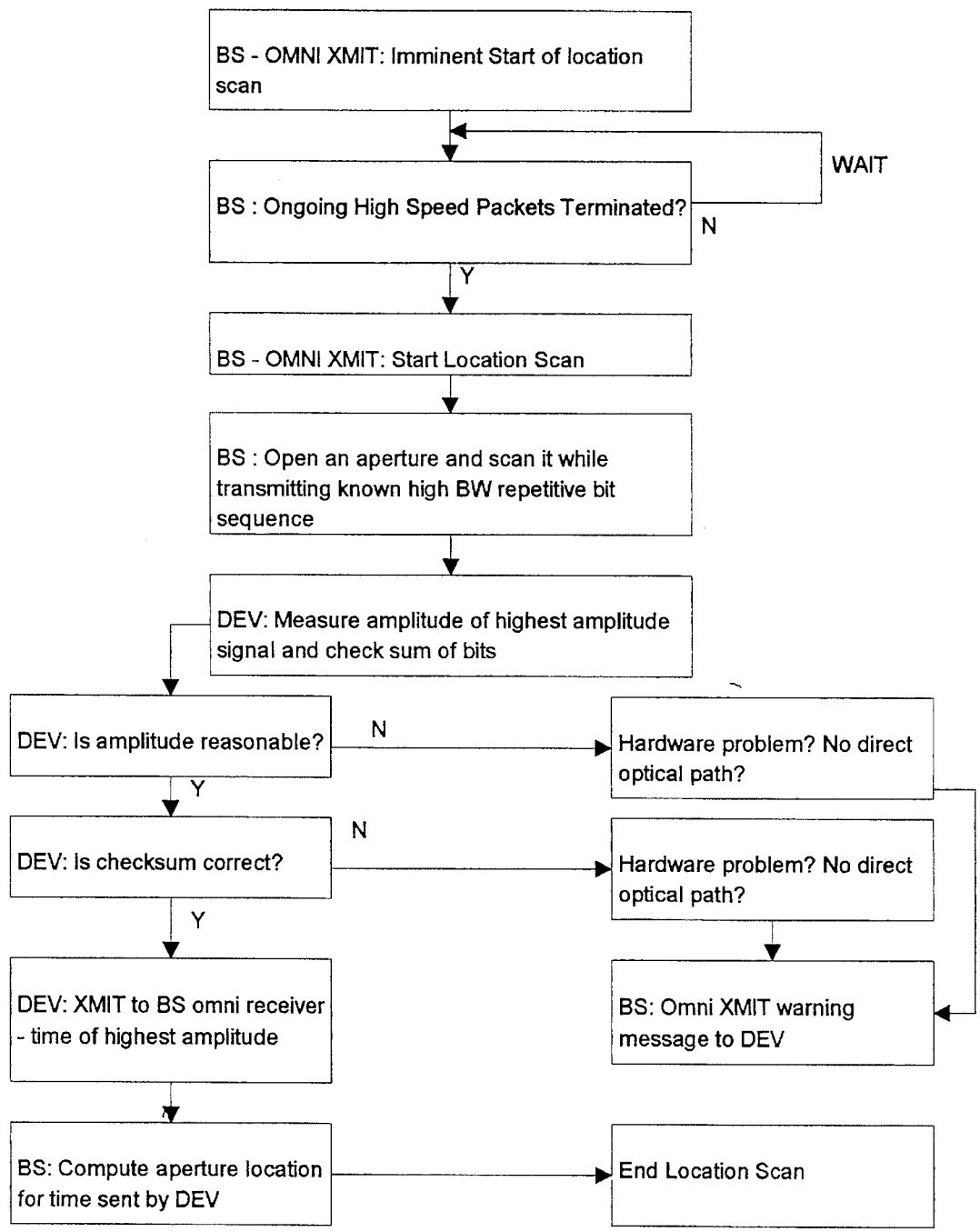
FIG. 4 is a flow chart showing a sequence of steps employed in the invention.
Figure 5:
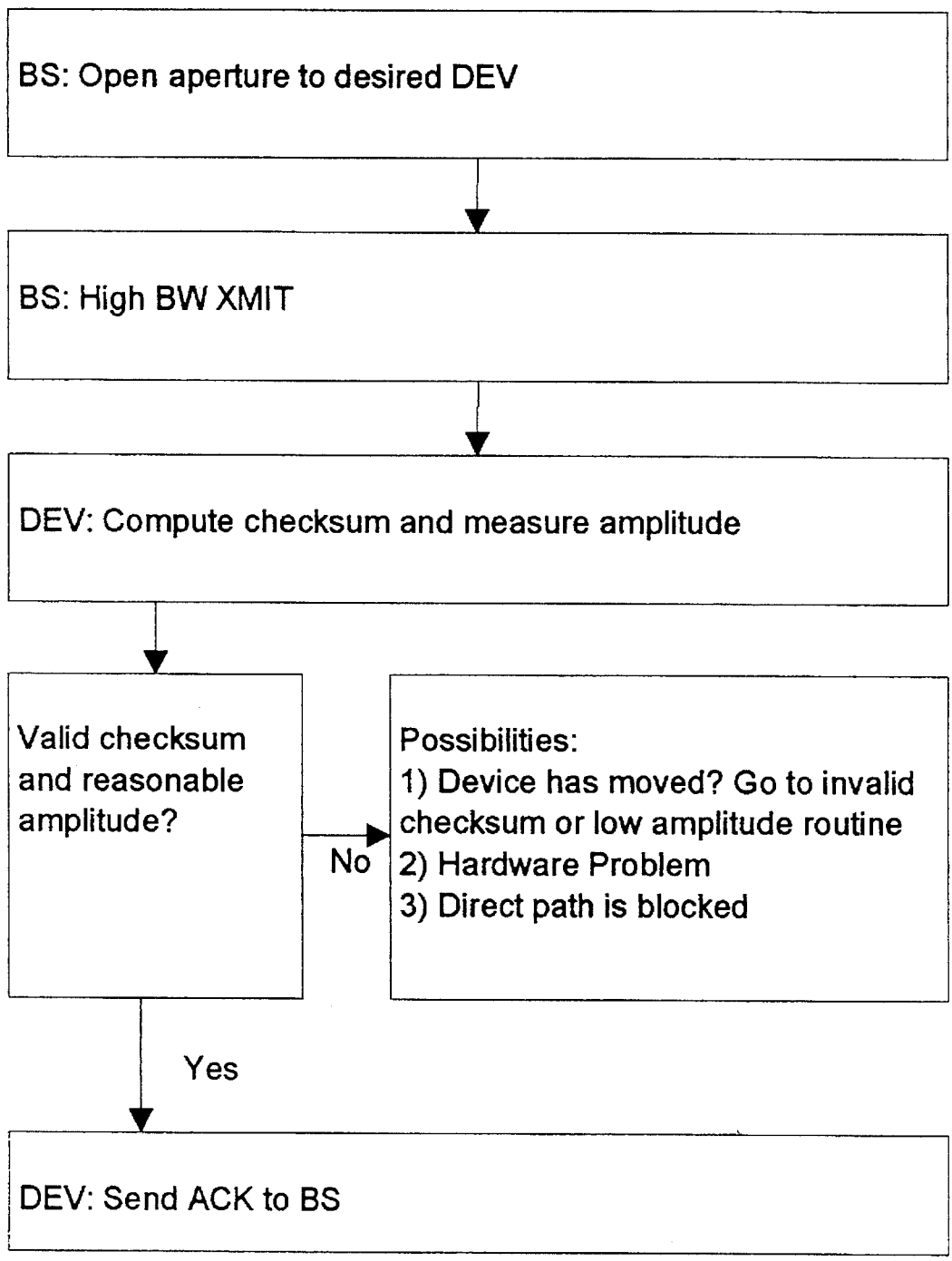
FIG. 5 is another flow chart showing a sequence of steps employed in the invention.
Figure 6:
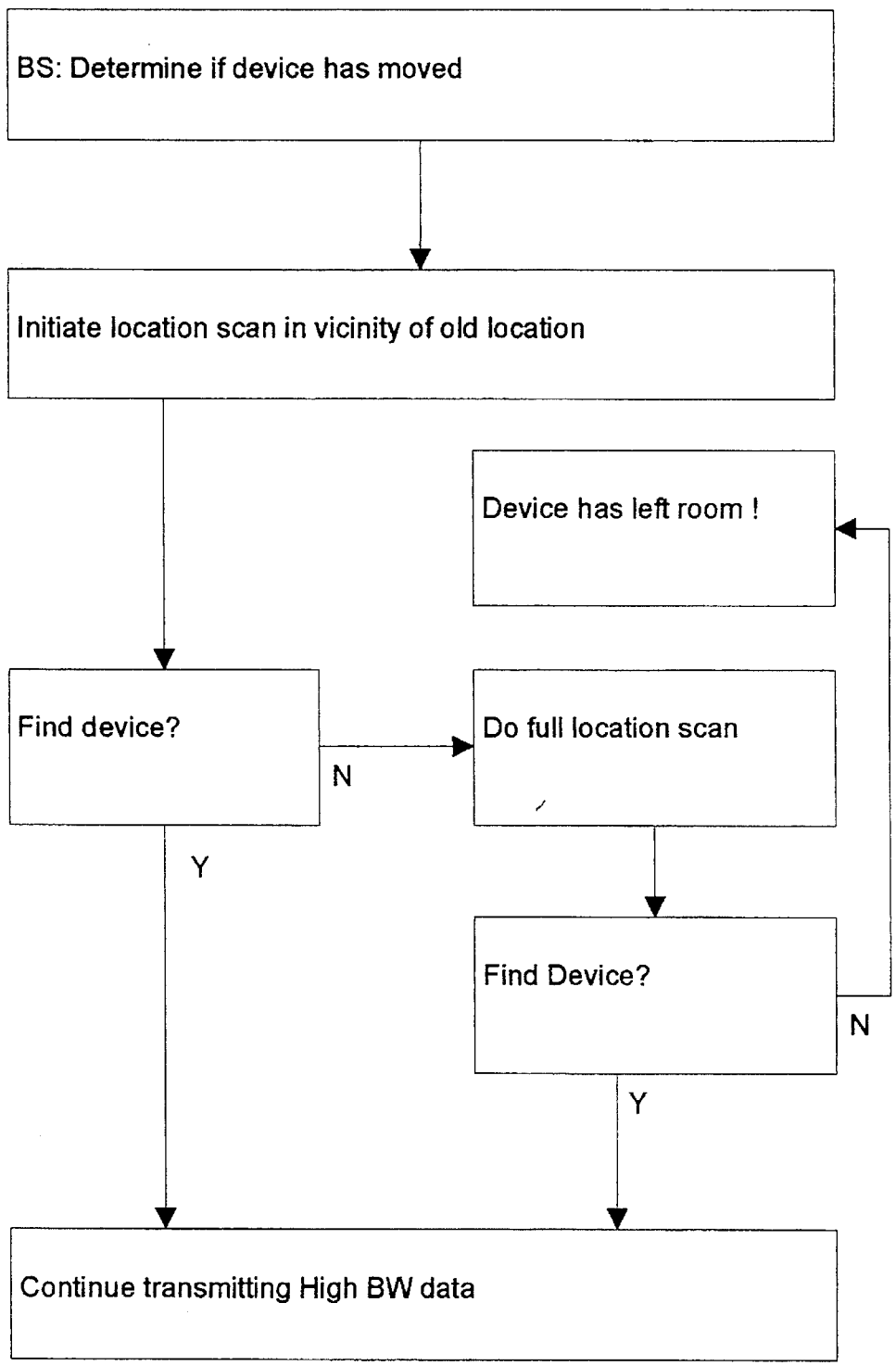
FIG. 6 is yet another flow chart showing a sequence of steps employed in the invention.

A typical sequence of operations involving the base station IR source 18 and receiver 19, the base station omnidirectional receiver 22, and a device in the room, such as device 15, is given below, in which the following nomenclature is used:
BS=Base station on ceiling
OMNI=Omnidirectional
XMIT=Transmit
REC=Receive
DEV=Devices in room
BW=Bandwidth
ACK=Acknowledgement To open up a communication station to conduct traffic from the base station to a particular device, the following sequence shown in FIG. 4 and FIG. 5 can be followed. To check whether the device has been moved since the last full location scan, the sequence shown in FIG. 6 can be followed.

Figure 7:
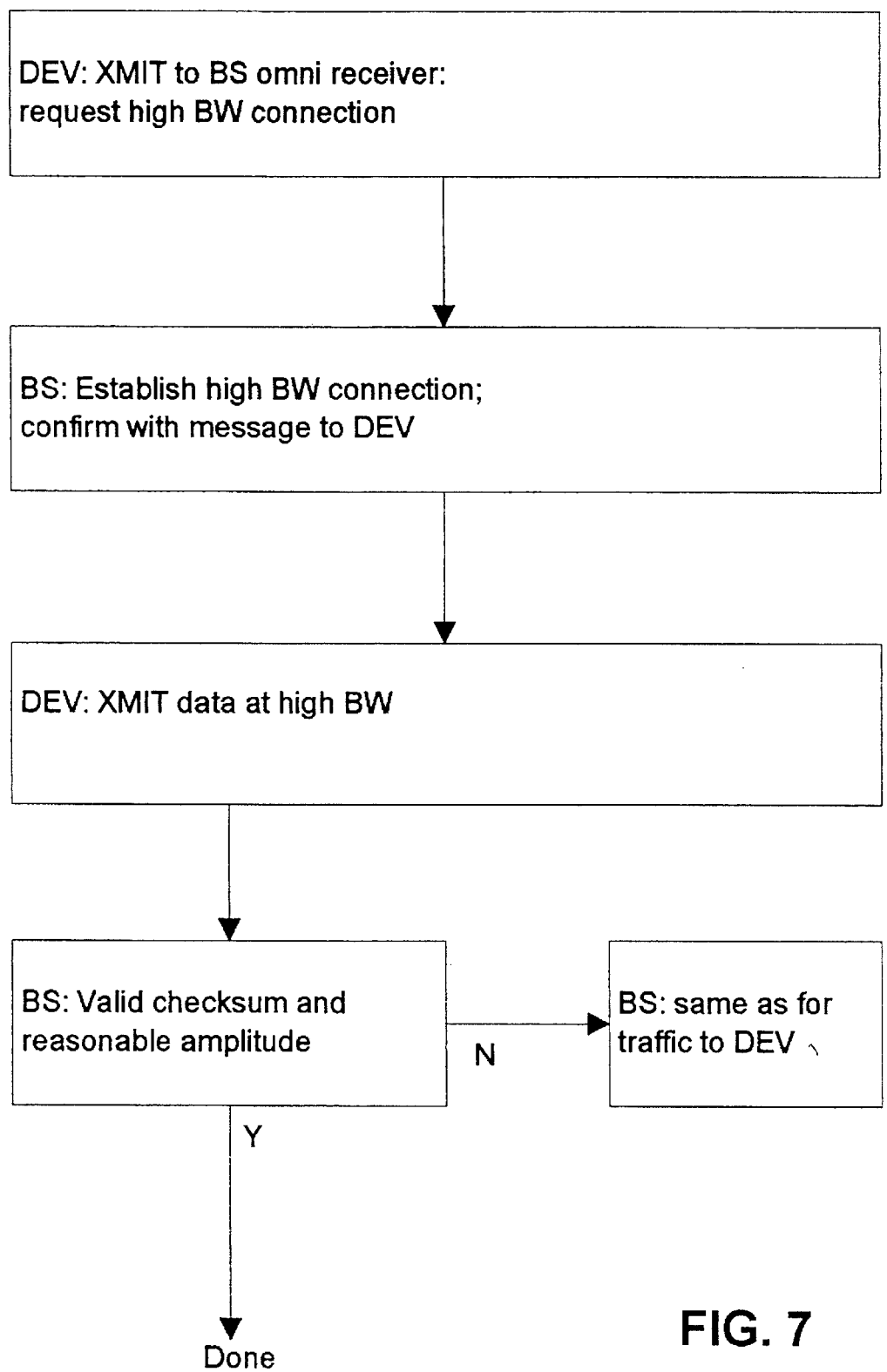
FIG. 7 is still another flow chart showing a sequence of steps employed in the invention.

When the device has been located and the communication link renewed, the sequence shown in FIG. 7 can be used.

In certain systems, it may help to completely isolate the high bandwidth channel from the omni channel. This could be done by using narrow band optical filtering in the system at both the device end and at the base station, by covering each transmitter/receiver pair with narrow bandwidth filters.

It will also be appreciated that the multipath problem exists even if the room contains but a single device, since IR radiation from a diffuse source broadcast in all directions means that multiple reflections will arrive at different times at the single target receiver thereby limiting the bandwidth of a communication link to the target. Hence, the invention is also applicable to rooms or areas containing only a single device.

Figure 2:
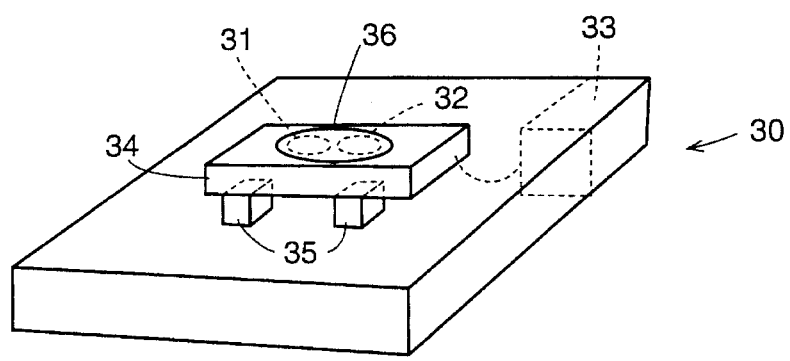
FIG. 2 is a perspective view of one form of target device for use in the system of FIG. 1.

Similarly, it will be recognized that a suitable trade-off has to be made between the size of the aperture 25 and the loss in bandwidth. Multipath reflections, albeit reduced, are still possible from those IR rays in the beam 26 that may reflect off of objects adjacent to the selected device. In general, the aperture should be made small enough for the source to see only one target device, but diffraction effects at the aperture edge may limit the minimum aperture size. Another approach is to locate on or adjacent each device a shield with an aperture aligned with the IR source. However, since it is difficult if not impossible to always position the target device so that its emitter and receiver are always pointing in the right direction, a better approach in accordance with the invention is to provide each target device with a covering addressable LCD panel and an embedded microprocessor. This embodiment is illustrated in FIG. 2, which shows just one device 30 with its built-in IR emitter 31, IR receiver 32, controlling microprocessor 33, and covering LCD panel 34 mounted on posts 35 over the emitter/receiver combination. In operation, the microprocessor 33 would be programmed to cause a transmissive aperture 36 to scan across the panel 34 whenever it is desired to establish a communication link with an active source 18, 19 until the alignment of the source 18 with the receiver 32 associated with the device 30 by positioning of the aperture 36 is optimized by determining the peak signal intensity.

In the example given in connection with FIG. 1, target devices are scattered throughout a room, to be located and a primitive communication link established. The invention is not limited to such or similar applications, but will be of special benefit when applied to an environment such as a meeting or conference room, or standing and moving around the room. Each person may have associated with him or her more sophisticated and mobile computer equipment, such as a laptop computer or hand-held computer with considerable processing power, each equipped with a target device of the type illustrated in FIG. 3 or its equivalent. The object, as before, would be to locate and select one or more particular persons via their target device and establish a large bandwidth communication link with his or her computing machine and thus with the person involved. The invention has particular utility in such a setting of potentially or actually moving persons where the need to dynamically track such persons is more critical.

The invention is thus not only applicable to locating target devices stored on shelves or in other ways inside a room, but also applies to locating persons, for example, attending meetings and carrying a battery-operated device 14–16 for location and/or communication purposes, which in general serve as examples of the importance of expanding the utility of mobile, interactive computing devices as are used in this invention.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. This scope of the invention is indicated by the appended claims rather than by the foregoing description.

What is claimed is:

1. A beam steering system comprising:
   (a) a first device for generating and for receiving omnidirectional optical radiation,
   (b) multiple spaced second devices spaced from the first device and each comprising an optical detector and an optical emitter for establishing a communication channel with the first device,
   (c) opaque means located adjacent to the first device and between the latter and all of the second devices and comprising means for selectively forming a transmissive aperture for said beam at different location in said opaque means in response to electrical signals,
   (d) means connected to the first device and to the opaque means for generating electrical signals to the opaque means to cause a transmissive aperture to be opened at a position oriented such that only one of said second devices is aligned with and can communicate point-to-point via a communication channel with said first device.

2. The system of claim 1, wherein the optical radiation is infrared radiation, and the opaque means comprises an addressable LCD panel.

3. The system of claim 1, further comprising means for applying signals to said LCD to open up an aperture and to cause the aperture to scan across the LCD.

4. The system of claim 1, further comprising a omnidirectional receiver associated with the first device.

5. A beam steering system comprising:
   (a) a first device for generating and for receiving a beam of infra-red optical radiation,
   (b) a second device spaced from the first device and comprising an optical detector and an optical emitter,
   (c) opaque means located adjacent to the first device and between the latter and the second device and comprising an addressable first LCD panel for selectively forming a transmissive aperture for said beam at different locations in said opaque means in response to electrical signals, whereby the optical beam can be caused to pass through said aperture only in certain directions oriented with said aperture, one of said locations causing the aperture to be aligned with the first and second devices,
   (d) a second LCD display panel located over and covering the second device, and means for opening up an aperture in the second LCD display panel at selected locations of the panel.

6. The system of claim 5, further comprising means for applying signals to said first LCD panel to open up an aperture at a particular location.

7. The system of claim 5, further comprising means for applying signals to said first LCD panel to open up an aperture and to cause the aperture to scan across the LCD.

8. The system of claim 5, further comprising a omnidirectional receiver associated with the first device.

9. The system of claim 5, further comprising means for establishing a communication link between the first and second devices via a transmissive aperture in the opaque means.

* * * * *